Nov. 21, 1939.   G. J. THOMAS   2,181,029
BRAKE CONSTRUCTION
Filed Oct. 11, 1937   2 Sheets-Sheet 2
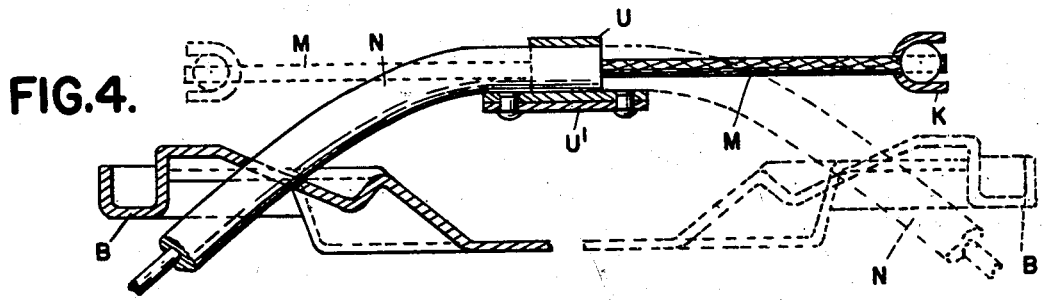
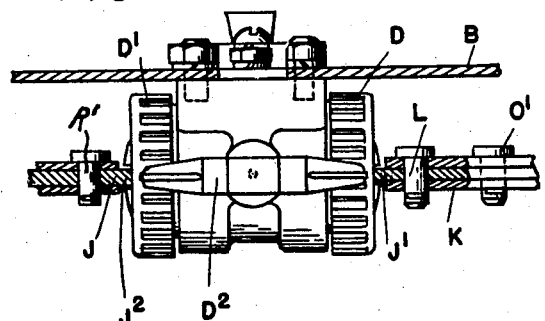
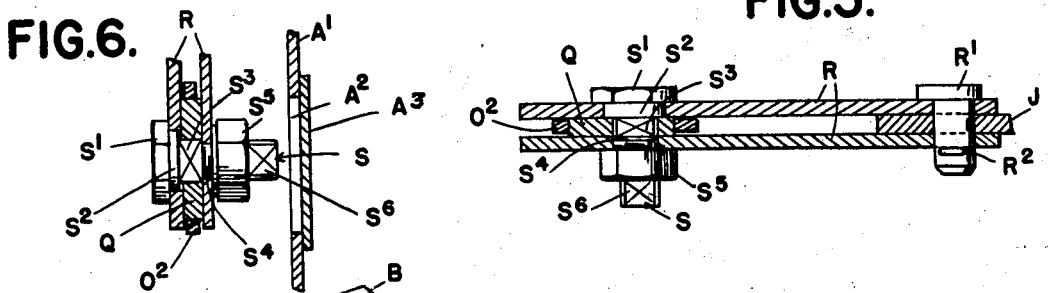
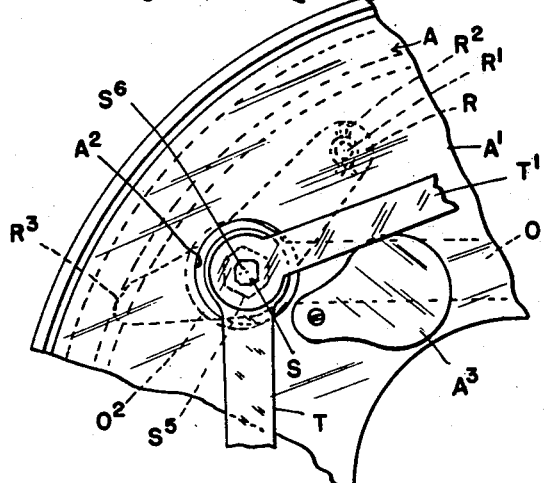
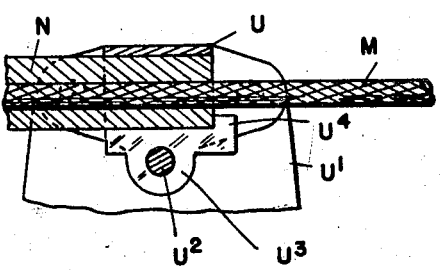
INVENTOR
GEORGE JOSEPH THOMAS
BY
*Whittemore Hulbert & Belknap*
ATTORNEYS Patented Nov. 21, 1939

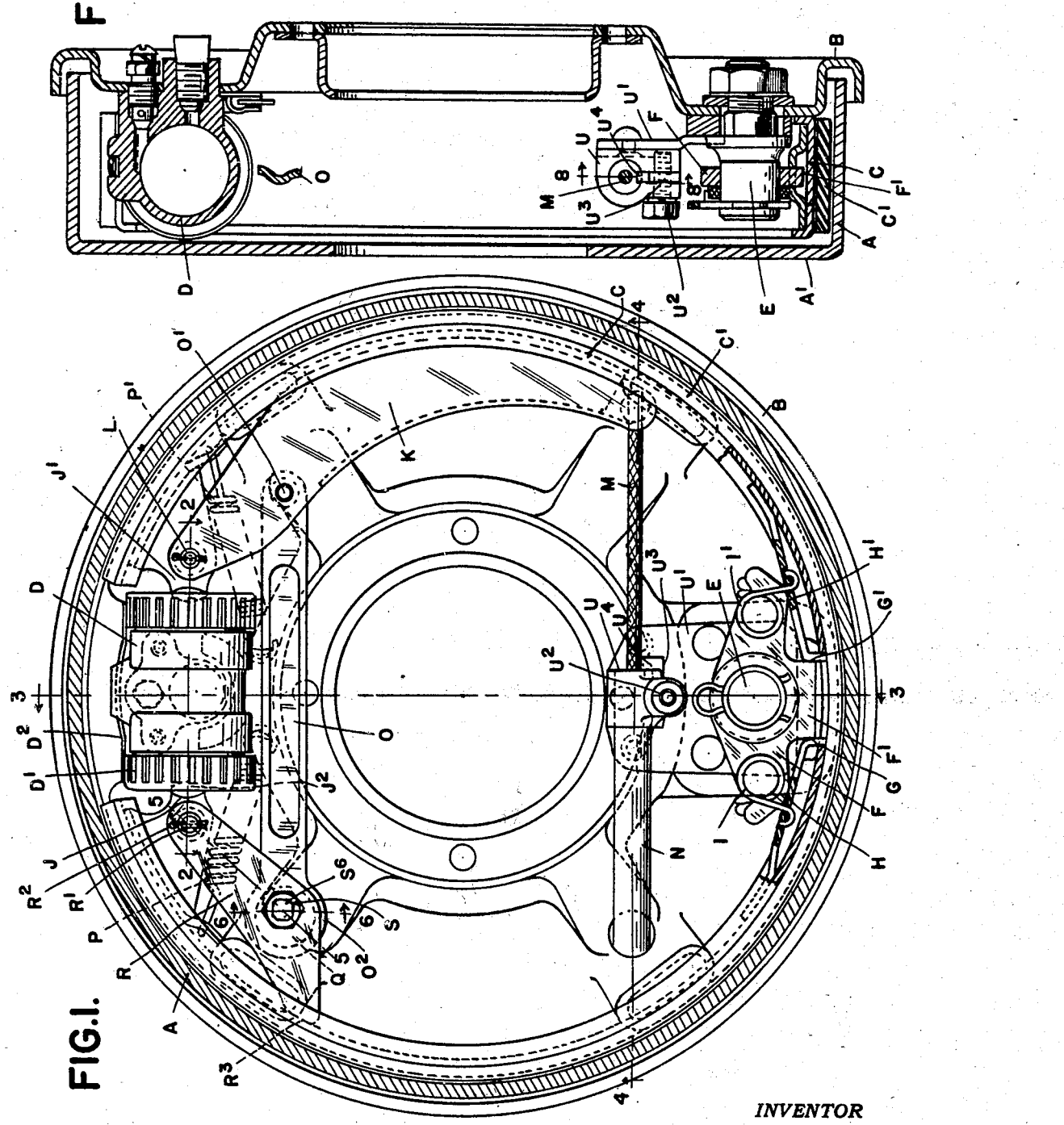

2,181,029

UNITED STATES PATENT OFFICE 2,181,029

BRAKE CONSTRUCTION

George Joseph Thomas, Birmingham, Mich., assignor to Kelsey-Hayes Wheel Company, Detroit, Mich., a corporation of Delaware Application October 11, 1937, Serial No. 168,496

5 Claims. (Cl. 188—79.5)

The invention relates to wheel brake mechanisms of that type in which brake friction means within a brake drum is operated through the medium of a lever and link within the drum and a flexible actuating connection extending out therefrom. More particularly, the invention relates to constructions which are provided with both hydraulic and mechanical actuating means, and the invention consists in certain features of construction as hereinafter set forth.

In the drawings:

Figure 1 is a section through the brake drum in the plane of rotation showing the brake mechanism within the same;

Figure 2 is a horizontal section on line 2—2 of Figure 1, showing the hydraulic actuator in elevation;

Figure 3 is a vertical section on line 3—3 of Figure 1;

Figure 4 is a horizontal section on line 4—4 of Figure 1;

Figure 5 is a section on line 5—5 of Figure 1;

Figure 6 is an enlarged cross section on line 6—6 of Figure 1;

Figure 7 is an elevation of a portion of the brake drum showing the same in position for adjustment;

Figure 8 is a section on line 8—8 of Figure 3.

In general construction, the brake mechanism includes a drum A, a brake head or backing plate B, and brake friction means C in the form of a flexible band having its ends spaced from each other for the reception of a hydraulic actuator D therebetween. The band is centrally anchored on a post E through the medium of a rockable member F having a radially extending arm F' engaging oppositely facing shoulders G and G', and also having bearing portions H and H' for alternatively pressing the band against the drum, dependent upon the direction of rotation. Springs I and I' normally hold the member E in neutral position where the band is spaced from the drum. As specifically shown, the band C is of channel-shaped cross-section, being provided on its outer face with the lining C'. The end portions are provided with inwardly extending web members J and J' which have portions $J^2$ extending in axial alignment with the hydraulic actuator, and engaging the same. The mechanical actuator comprises a lever K extending around on one side of the drum and having one end connected by a pivot L to the member J' and preferably bifurcated to embrace said member. The opposite end of the lever is connected to a flexible wire or cable M which passes into a conduit N extending through the brake backing B. A link O extends from the lever to the opposite end portion of the band, so that a pull upon the member M will have the effect of spreading the ends of the band and applying the brake. Springs P, P' connected to the opposite end portions of the band and anchored on the brake backing plate serve to hold the band normally in retracted position. The construction as thus far described is of a well known type and forms no part of my invention, except as hereinafter set forth.

It is one of the objects of the invention to provide means through which both the hydraulic and the mechanical actuator may be adjusted to compensate for wear in the brake linings. It is a further object to provide for such adjustment without disassembly of the parts, and still further to obtain a construction in which the same elements may be assembled to form either a right-hand or left-hand construction. These and other advantages are attained by the following construction.

The link O has one end connected to the lever K between the furcations thereof by a pin O', while the opposite end of said link is provided with a large eye $O^2$. This eye pivotally engages a member Q which is embraced by a pair of lever members R. These members are pivotally attached at one end to the member J by the pivot pin R' and cotter pin $R^2$, while at their opposite ends $R^3$, they bear against the inner face of the brake band. The member Q is attached to the members R to be adjustable about an eccentric axis. This attachment comprises a bolt S having a head S' for engaging one of the members R, a circular portion $S^2$ passing through a correspondingly shaped aperture in said member, a polygonal portion $S^3$ engaging a correspondingly shaped eccentric aperture in the member Q, a threaded portion $S^4$ passing through the other member R to be engaged by a clamping nut $S^5$, while the outer end of the member S has a polygonal portion $S^6$ for engagement with a socket wrench. The axial length of the portion $S^2$ is slightly less than the thickness of the plate R through which it passes, so that when the nut S is tightened both plates R will be clamped against the opposite sides of the member Q. If, however, the nut $S^5$ is loosened and the bolt S turned by its polygonal end portion $S^6$, this will move the member Q about an eccentric axis and adjust the same toward or from the brake lining. In other words, the adjustment of the member Q will alter the normal distance between the ends of the broke band or the effective length of the link O, thereby compensating for wear in the brake lining. To permit of such adjustment when the brake is assembled in the drum A, the web portion A' of the latter is provided at one point with an aperture A² of sufficient size for the insertion of the adjustment tools. Thus, as shown in Figure 7, by rotating the drum so as to register this aperture A² with the member Q a socket wrench T may be inserted through the aperture into engagement with the nut S⁵, and a concentric inner socket wrench T' engaged with the polygonal portion S⁶. The operator may thus loosen the clamping nut by the wrench T; rotate the pin S by the wrench T'; and after proper adjustment of the member Q, again clamp the nut by the wrench T. The axial length of the member Q is slightly greater than the thickness of the eye portion O² of the link O, so that the latter is free to pivot thereon. Also, the members R are free to pivot on the pins R'. Thus, when the brake is operated by the hydraulic actuator, the members R and link O may remain relatively inactive, while the ends of the band are spread. On the other hand, when the brake is operated by the mechanical actuator the thrust of the link O under actuation of the lever K will be communicated to the band through the portions R³ of the members R which rest against said band.

Brake mechanisms must be made right and left hand, according to the side of the vehicle on which they are placed. The elements of my improved construction are such as to be capable of assembly either as a right-hand or a left-hand brake. Thus, the lever K may be mounted as shown in Figure 1, being pivoted to the member J', or it may be reversed and pivoted to the member J. In the same manner, the members R shown in Figure 1 as pivotally connected to the member J, may be reversed and pivoted to the member J'. It is further necessary in changing from left to right hand to reverse the position of the conduit N and flexible wire or cable M. To facilitate this, I have devised the following construction. As before stated, the conduit N passes through an aperture in the brake backing and the portion within the drum is then curved to extend into the plane of the lever K. The end of the conduit is clamped by a bearing U which is rigidly secured to the brake backing, as by means of the plate U'. The bearing U is split in the axial plane thereof, and the portions on opposite sides of the split are clamped against the conduit by a bolt U². There is also a plate U³ inserted in the split and secured by the bolt U², said plate being provided at one end with a hook U⁴ for overlapping the bore in the bearing and forming a stop for the end of the conduit N. Thus, the plate U³ may be readily reversed from right to left according to the direction of the conduit N within the brake housing, and in either position the hook U⁴ will form a stop for exactly positioning the end of the casing.

The hydraulic actuator D may be of any suitable construction, but preferably one provided with adjustment means to compensate for wear in the brake friction means. As shown, this adjustment means includes the serrated rotatable end members D', and a resilient member D² for engaging the same and normally holding said members from rotation, this being a known construction and forming no part of the present invention. However, the aperture A² in the web A' of the brake drum also provides means for adjusting the hydraulic actuator as well as the mechanical actuator. Thus, whenever it is found desirable to make adjustment to compensate for wear in the brake lining the aperture A² may be registered successively with the members D' to permit of adjustment of the latter and subsequently registered with the bolt S to provide access to the nut S⁵ and polygonal end portion S⁶. This provides a means for adjusting the brake whenever necessary and the aperture A² may be normally closed by a guard plate A³ so as to exclude dirt from the interior of the drum.

What I claim as my invention is:

1. In a brake, the combination with brake friction means including a flexible band having spaced end portions, a hydraulic actuator located between said ends, members projecting radially inward from the opposite end portions of said band extending into operative relation to said actuator, levers pivotally attached to said members, one of said levers normally bearing against said band, a link extending between said levers and pivotally attached thereto, the pivotal attachment to one of said levers being adjustable about an eccentric axis to change the effective length of the link and to thereby compensate for wear in the brake friction means.

2. In a brake, the combination with brake friction means including a flexible band having spaced end portions, a hydraulic actuator located between said end portions, members projecting radially inward from said band extending into operative relation to said hydraulic actuator, levers pivotally attached to said members and extending on opposite sides of the drum, a link extending between and pivotally connected to said levers, one of said levers being of the first class and the other the third class and normally bearing against said band, the pivotal connection between the latter lever and said link being adjustable about an eccentric axis to change the effective length of the link and to thereby compensate for wear in the brake friction means.

3. In a brake, the combination with brake friction means including a flexible band having spaced end portions, a hydraulic actuator located between said end portions, members extending radially inward from said end portions into operative relation to said hydraulic actuator, levers pivotally attached to said members and extending on opposite sides of the band, a link extending between said levers and pivotally attached thereto, the pivotal attachment at one end of said link being adjustable about an eccentric axis to vary the effective length of the link, said levers being exchangeable in position to adapt the brake for right or left.

4. In a brake, the combination with brake friction means including a flexible band having spaced end portions, a hydraulic actuator located between said end portions, members projecting radially inward from said end portions into operative relation to said hydraulic actuator, levers pivotally attached to said members and extending upon opposite sides of said band, a link extending between said levers beneath said hydraulic actuator, one of said levers being formed of spaced members embracing the end portion of said link, a pivot for engaging the link between said spaced portions, and a member for clamping said pivot between said members extending therethrough eccentrically of the pivot, said member also constituting a means for rotating the pivot about the eccentric axis to alter the effective length of the link.

5. In a brake, the combination with brake friction means including a band having spaced end portions, a hydraulic actuator located between said end portions, members extending radially inward from said end portions into operative relation to said actuator, levers pivotally attached to said members and extending on opposite sides of said band, a link extending between said levers, one of said levers being formed of spaced members embracing the end of the link, a pivot for engaging the link between said members, a bolt extending through said members and pivot eccentrically of the latter constituting a means for adjusting said pivot about an eccentric axis to vary the effective length of the link, a clamping nut engaging said bolt, a wrench engaging portion at the end of said bolt, and a brake drum having a web portion apertured for registration with said bolt and nut and providing access thereto for adjustment.

GEORGE JOSEPH THOMAS.